United States Patent
Yoshioka et al.

(10) Patent No.: US 12,537,627 B2
(45) Date of Patent: Jan. 27, 2026

(54) TERMINAL, BASE STATION, COMMUNICATION SYSTEM, AND COMMUNICATION METHOD TO ENABLE OR DISABLE FUNCTION TO TRANSMIT FEEDBACK INFORMATION

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 803 days.

(21) Appl. No.: 17/755,853

(22) PCT Filed: Nov. 15, 2019

(86) PCT No.: PCT/JP2019/044937
§ 371 (c)(1),
(2) Date: May 10, 2022

(87) PCT Pub. No.: WO2021/095254
PCT Pub. Date: May 20, 2021

(65) Prior Publication Data
US 2022/0385410 A1    Dec. 1, 2022

(51) Int. Cl.
*H04L 1/1812*    (2023.01)
*H04L 5/00*    (2006.01)
*H04W 72/0446*    (2023.01)
*H04W 72/0453*    (2023.01)
*H04W 72/20*    (2023.01)

(52) U.S. Cl.
CPC .......... *H04L 1/1812* (2013.01); *H04L 5/0053* (2013.01); *H04W 72/0446* (2013.01); *H04W 72/0453* (2013.01); *H04W 72/20* (2023.01)

(58) Field of Classification Search
CPC .. H04W 72/0453; H04W 4/40; H04L 1/1812; H04L 1/1864; H04L 1/1685
See application file for complete search history.

(56) References Cited

U.S. PATENT DOCUMENTS

2022/0240227 A1* 7/2022 Lee .................. H04L 1/1825
2022/0376844 A1* 11/2022 Muruganathan ...... H04W 72/23

OTHER PUBLICATIONS

3GPP TSG RAN WG1 #98bis; R1-1910373 "Mode 1 resource allocation for NR SL" Oppo; Chongqing, China; Oct. 14-20, 2019 (9 pages).
3GPP TSG RAN WG1 #99; R1-1912790 "Mode 1 resource allocation for NR SL" Oppo; Reno, USA; Nov. 18-22, 2019 (12 pages).
3GPP TS 38.214 V15.5.0 "3rd Generation Partnership Project; Technical Specification Group Radio Access Network; NR; Physical layer procedures for data (Release 15)" Mar. 2019 (103 pages).
International Search Report issued in International Application No. PCT/JP2019/044937, mailed Jun. 9, 2020 (3 pages).
Written Opinion issued in International Application No. PCT/JP2019/044937; Dated Jun. 9, 2020 (3 pages).

* cited by examiner

*Primary Examiner* — Sulaiman Nooristany
(74) *Attorney, Agent, or Firm* — Osha Bergman Watanabe & Burton LLP

(57) ABSTRACT

A terminal includes: a receiving unit that receives specific sidelink control information related to an indication that disables a function of performing Hybrid Automatic Repeat Request (HARQ) feedback corresponding to a sidelink to a base station; and a control unit that performs a specific operation for the HARQ feedback in a case where the receiving unit receives the specific sidelink control information related to the indication.

5 Claims, 11 Drawing Sheets

TERMINAL, BASE STATION, COMMUNICATION SYSTEM, AND COMMUNICATION METHOD TO ENABLE OR DISABLE FUNCTION TO TRANSMIT FEEDBACK INFORMATION

TECHNICAL FIELD

The present invention relates to a terminal and a communication method in a radio communication system.

BACKGROUND ART

In LTE (Long Term Evolution) and a successor system to LTE (for example, LTE-A (LTE Advanced) and NR (New Radio) (also referred to as 5G)), a sidelink (also referred to as D2D (Device to Device)) technology in which terminals, such as user equipment (UE), directly communicate with each other without a base station has been discussed.

In addition, implementation of V2X (Vehicle to Everything) has been discussed, and development of technical specifications is in progress. Here, V2X is a part of ITS (Intelligent Transport Systems), and is a general term for V2V (Vehicle to Vehicle) that means a form of communication performed between vehicles, V2I (Vehicle to Infrastructure) that means a form of communication performed between a vehicle and a road-side unit (RSU) provided on the side of a road, V2N (Vehicle to Nomadic device) that means a form of communication performed between a vehicle and a mobile terminal of a driver, and V2P (Vehicle to Pedestrian) that means a form of communication performed between a vehicle and a mobile terminal of a pedestrian.

CITATION LIST

Non-Patent Document

Non-Patent Document 1: 3GPP TS 38.214 V15.5.0 (2019-03)

SUMMARY OF THE INVENTION

Problem to be Solved by the Invention

It is assumed that Hybrid Automatic Repeat Request (HARQ) feedback will be introduced to the sidelink communication of Release 16 NR. A terminal that performs sidelink communication can transmit HARQ-Acknowledgement (HARQ-ACK) corresponding to the sidelink communication to a base station.

It is necessary to clarify the operation of the terminal when transmitting SL HARQ-ACK to the base station.

Means for Solving Problem

According to an aspect of the invention, there is provided a terminal including: a receiving unit that receives specific sidelink control information related to an indication that disables a function of performing Hybrid Automatic Repeat Request (HARQ) feedback corresponding to a sidelink to a base station; and a control unit that performs a specific operation for the HARQ feedback in a case where the receiving unit receives the specific sidelink control information related to the indication.

Effect of the Invention

According to the embodiment, the operation of the terminal when transmitting the SL HARQ-ACK to the base station is clarified.

MODE(S) FOR CARRYING OUT THE INVENTION

Hereinafter, an embodiment (the present embodiment) of the invention will be described with reference to the diagrams. In addition, the embodiment described below is merely an example, and the embodiment to which the invention is applied is not limited to the following embodiment.

The method of direct communication between terminals in the present embodiment is assumed to be LTE or NR sidelink (SL (Sidelink)), but the direct communication method is not limited to this method. In addition, the name "sidelink" is an example, and the name "sidelink" may not be used and UL (Uplink) may include the function of SL. The SL may be distinguished from DL (Downlink) or UL by a difference in frequency or time resources, or may have another name.

In addition, the UL and the SL may be distinguished by a difference in any one or a combination of any two or more of a time resource, a frequency resource, a time/frequency resource, a reference signal referred to for determining Pathloss in the transmission power control, and a reference signal used for synchronization (PSS/SSS/PSSS/SSSS).

For example, in the UL, a reference signal of an antenna port X_ANT is used as the reference signal referred to for determining Pathloss in the transmission power control. In the SL (including UL used as SL), a reference signal of an antenna port Y_ANT is used as the reference signal referred to for determining Pathloss in the transmission power control.

In addition, although the present embodiment mainly assumes a form in which a terminal (which may be referred to as user equipment (UE)) is mounted in a vehicle, the embodiment of the invention is not limited to this form. For example, the terminal may be a terminal held by a person, or the terminal may be a device mounted in a drone or an aircraft, or the terminal may be a base station, an RSU, a relay node, user equipment having a scheduling capability, or the like.

(System Configuration)

Figure 1:
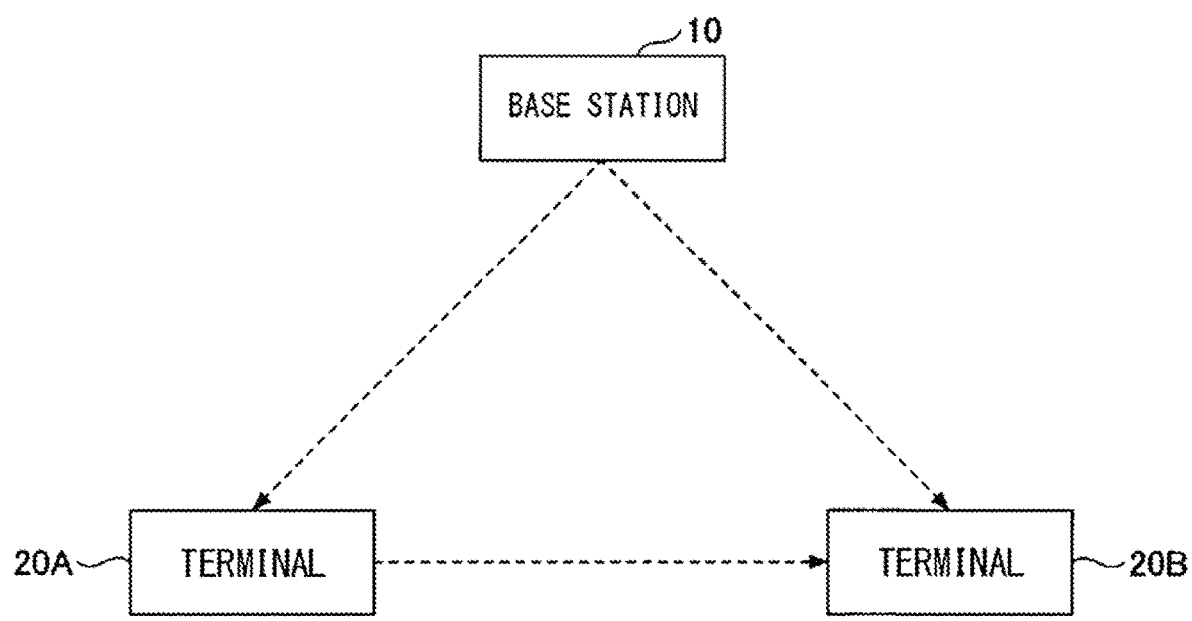
FIG. 1 is a diagram illustrating a configuration example of a radio communication system according to an embodiment.

FIG. 1 is a diagram illustrating a configuration example of a radio communication system according to the embodiment. As illustrated in FIG. 1, the radio communication system according to the present embodiment includes a base station 10, a terminal 20A, and a terminal 20B. In addition, although there may be many terminals in reality, FIG. 1 illustrates the terminals 20A and 20B as an example.

In FIG. 1, it is intended that the terminal 20A is a transmitting side and the terminal 20B is a receiving side, but both the terminals 20A and 20B have both a transmitting function and a receiving function. Hereinafter, the terminals 20A and 20B will be simply referred to as the "terminal 20" or a "terminal" unless otherwise distinguished. In FIG. 1, as an example, a case where both the terminals 20A and 20B are in the coverage is illustrated. However, the operation in the present embodiment can be applied to any of a case where all the terminals 20 are in the coverage, a case where some of the terminals 20 are in the coverage and the other terminals 20 are out of the coverage, and a case where all the terminals 20 are out of the coverage.

In the present embodiment, the terminal 20 is, for example, a device mounted in a vehicle such as an automobile, and has a function of cellular communication as a UE in LTE or NR and a sidelink function. In addition, the terminal 20 has a function of acquiring report information (position, event information, and the like), such as a GPS device, a camera, and various sensors. In addition, the terminal 20 may be a general mobile terminal (smartphone or the like). In addition, the terminal 20 may be an RSU. The RSU may be a UE type RSU having a UE function, or may be a BS type RSU having a base station function (may be referred to as a gNB type UE), or may be a relay node.

In addition, the terminal 20 does not have to be a device having one housing. For example, even if various sensors are dispersedly arranged in a vehicle, a device including the various sensors is the terminal 20. In addition, the terminal 20 may have a function of transmitting and receiving data to and from various sensors without including the various sensors.

In addition, the processing contents of the sidelink transmission of the terminal 20 are basically the same as the processing contents of the UL transmission in LTE or NR. For example, the terminal 20 scrambles a codeword of transmission data, modulates the scrambled codeword to generate complex-valued symbols, maps the complex-valued symbols (transmission signal) to one or two layers, and performs precoding. Then, the precoded complex-valued symbols are mapped to resource elements to generate a transmission signal (for example, CP-OFDM or DFT-s-OFDM), and the transmission signal is transmitted from each antenna port.

In addition, the base station 10 has a function of cellular communication as the base station 10 in LTE or NR and a function (for example, resource pool setting and resource allocation) for enabling communication of the terminal 20 in the present embodiment. In addition, the base station 10 may be an RSU (gNB type RSU), a relay node, or a terminal having a scheduling function.

In addition, in the radio communication system according to the present embodiment, the signal waveform used by the terminal 20 for SL or UL may be OFDMA, or may be SC-FDMA, or may be other signal waveforms. In addition, in the radio communication system according to the present embodiment, as an example, a frame including a plurality of subframes (for example, 10 subframes) is formed in the time direction, and a plurality of subcarriers are present in the frequency direction. One subframe is an example of one transmission time interval (TTI). However, the TTI is not always a subframe. For example, the TTI may be slot or mini-slot, or any other time domain unit. In addition, the number of slots per subframe may be determined according to the subcarrier interval. In addition, the number of symbols per slot may be 14 symbols.

It is assumed that Hybrid Automatic Repeat Request (HARQ) will be introduced to the sidelink communication of 3GPP Release 16 NR. In the sidelink communication, HARQ-Acknowledgement (HARQ-ACK) is transmitted using Physical Sidelink Feedback Channel (PSFCH).

A transport block is transmitted from the transmitting side terminal 20A to the receiving side terminal 20B by using Physical Sidelink Control Channel (PSCCH)/Physical Sidelink Shared Channel (PSSCH). In response to this, the terminal 20B transmits HARQ-ACK to the terminal 20A on the PSFCH.

Figure 2:
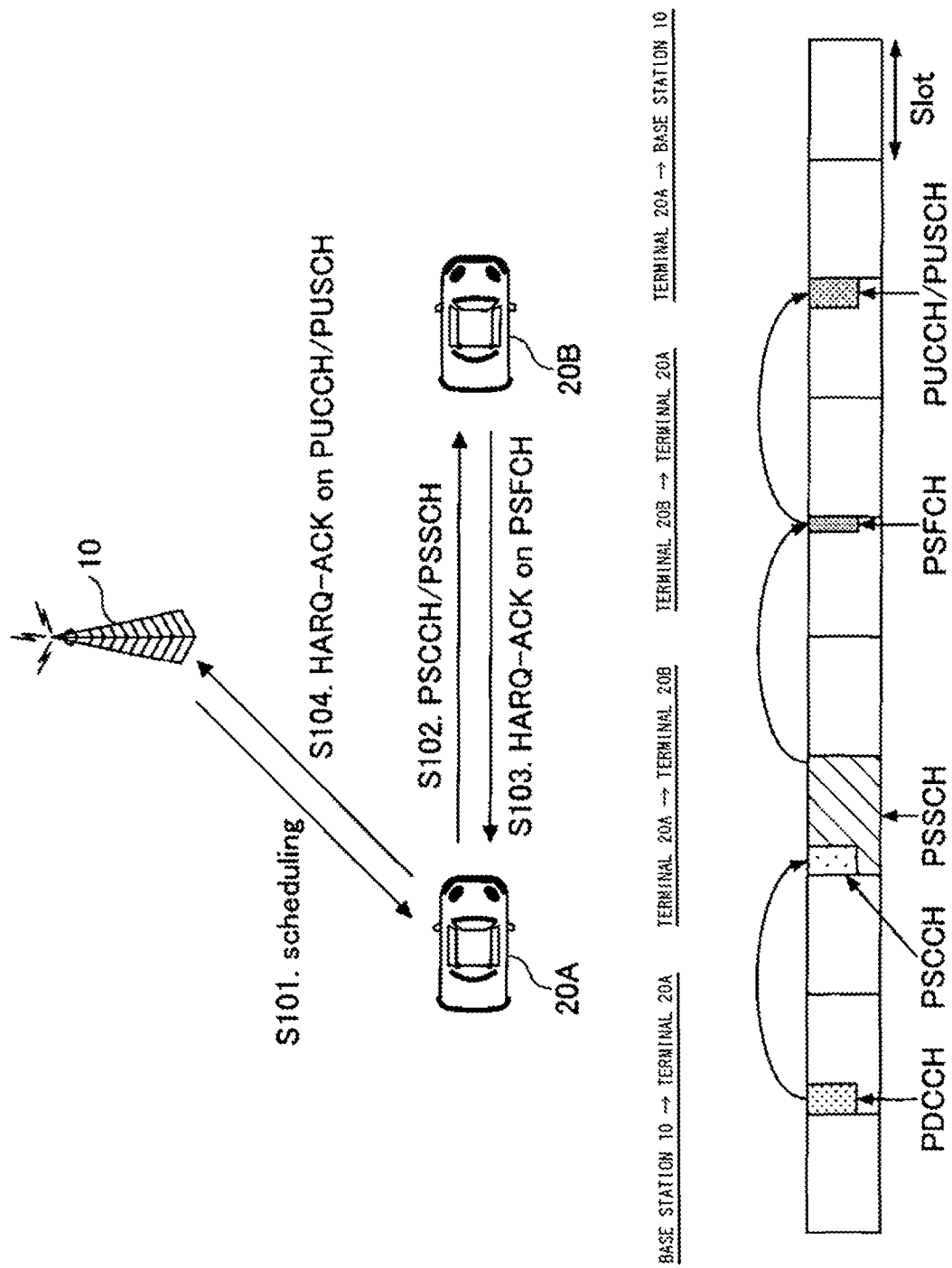
FIG. 2 is a diagram illustrating an example of SL transmission mode 1 defined by V2X of NR.

In the case of SL transmission mode 1 defined by V2X of NR, as illustrated in FIG. 2, it is assumed that the transmitting side terminal 20A transmits sidelink HARQ-ACK to the base station 10 (gNB). In the invention, "sidelink HARQ-ACK" may mean HARQ-ACK corresponding to a sidelink channel and/or resource. More specifically, for example, as illustrated in FIG. 2, the base station 10 performs scheduling for the terminal 20A (S101), and the terminal 20A transmits a transport block to the terminal 20B on the PSCCH/PSSCH (S102). The terminal 20B gives feedback to the terminal 20A regarding transmission of the transport block on the PSCCH/PSSCH (S103). Based on this, the terminal 20A gives HARQ-ACK feedback to the base station 10 (S104). For example, the terminal 20A may relay the HARQ-ACK (acknowledgement (ACK) or negative-acknowledgment (NACK)) received from the terminal 20B to the base station 10.

The transmission function of HARQ-ACK from the terminal 20B to the terminal 20A through the PSFCH can be enabled and disabled by setting (in advance), for example.

As described above, in mode 1 of sidelink communication of New Radio (NR) (NR-SL mode 1), it is assumed that the terminal 20 transmits Acknowledgement of Hybrid Automatic Repeat Request (SL HARQ-ACK) for the sidelink transmission to the base station 10 (gNB).

At the 3GPP meeting, the transmission of SL HARQ-ACK is under discussion. For example, in NR, it is assumed that a plurality of SL HARQ-ACKs are multiplexed on a single Physical Uplink Control Channel (PUCCH) resource. Thus, as a method of multiplexing a plurality of SL HARQ-ACKs on a single PUCCH resource, for example, reusing the method of multiplexing a plurality of HARQ-ACKs in the downlink (DL) defined in Release 15 of 3GPP has been discussed. In addition, it is also assumed that one or more SL HARQ-ACK bits and one or more DL HARQ-ACK bits are multiplexed in a single PUCCH resource.

In addition, it is also assumed that the Type I HARQ-ACK codebook and the Type II HARQ-ACK codebook are supported as codebooks for transmission of SL HARQ-ACK.

In addition, it is assumed that the SL-HARQ-ACK bit is mapped to the PUCCH resource to be transmitted, but in the case of collision with the Physical Uplink Shared Channel (PUSCH), it is assumed that the SL-HARQ-ACK bit is mapped to the PUSCH resource.

(Harq-Ack Codebook)

In addition, in the following embodiment, an example of the transmission of SL HARQ-ACK from the terminal 20 to the base station 10 using the HARQ-ACK codebook will be described. Therefore, first, an outline of the HARQ-ACK codebook corresponding to DL transmission will be described. In the case of generating a HARQ-ACK codebook related to the transmission of SL HARQ-ACK, Downlink may be replaced with Sidelink.

The HARQ-ACK codebook defines how to combine a plurality of HARQ-ACKs when the HARQ-ACKs are collectively multiplexed to be transmitted. The HARQ-ACK codebook may be configured to include bits for HARQ-ACK in at least one unit of: a time domain (for example, slot); a frequency domain (for example, component carrier (CC)); a spatial domain (for example, layer); a transport block (TB); and a group of code blocks forming a TB (code block group (CBG)). In addition, the CC is also called a cell, a serving cell, a carrier, or the like. In addition, the bit is also called a HARQ-ACK bit, HARQ-ACK information, a HARQ-ACK information bit, or the like. The HARQ-ACK codebook is also called a PDSCH-HARQ-ACK codebook (pdsch-HARQ-ACK-Codebook), a codebook, a HARQ codebook, a HARQ-ACK size, or the like.

The number of bits (size) included in the HARQ-ACK codebook may be determined in a semi-static or dynamic manner. The semi-static HARQ-ACK codebook is also called a Type I HARQ-ACK codebook, a semi-static codebook, or the like. The dynamic HARQ-ACK codebook is also called a Type II HARQ-ACK codebook, a dynamic codebook, or the like.

Whether to use the Type I HARQ-ACK codebook or the Type II HARQ-ACK codebook may be set in the terminal 20 by an upper layer parameter (for example, pdsch-HARQ-ACK-Codebook).

In the case of the Type I HARQ-ACK codebook, in a predetermined range (for example, a range set based on upper layer parameters), the terminal 20 may feed back the HARQ-ACK bits corresponding to the predetermined range regardless of the presence or absence of PDSCH scheduling.

The predetermined range may be determined based on at least one of: a predetermined period (for example, a set of a predetermined number of occasions for receiving PDSCHs that are candidates or a predetermined number of monitoring occasions m for PDCCH); the number of CCs set or activated in the terminal 20; the number of TBs (the number of layers or a rank); the number of CBGs per TB; and the presence or absence of application of spatial bundling. The predetermined range is also called a HARQ-ACK bundling window, a HARQ-ACK feedback window, a bundling window, a feedback window, or the like.

In the Type I HARQ-ACK codebook, within the predetermined range, even if there is no PDSCH scheduling for the terminal 20, the terminal 20 feeds back the NACK bit. Therefore, when the Type I HARQ-ACK codebook is used, it is also assumed that the number of HARQ-ACK bits to be fed back increases.

On the other hand, in the case of the Type II HARQ-ACK codebook, the terminal 20 may feed back the HARQ-ACK bit for the scheduled PDSCH within the above-described predetermined range.

Specifically, the terminal 20 may determine the number of bits of the Type II HARQ-ACK codebook based on a predetermined field in the DCI (for example, a DL allocation index (Downlink Assignment Indicator (Index) (DAI)) field). The DAI field may be split into a counter DAI (cDAI) and a total DAI (tDAI).

The counter DAI may indicate a counter value of downlink transmission (PDSCH, data, TB) scheduled within a predetermined period. For example, the counter DAI in the DCI that schedules data within the predetermined period may indicate the number counted first in the frequency domain (for example, CC) and then in the time domain within the predetermined period.

The total DAI may indicate the total value (total number) of pieces of data scheduled within a predetermined period. For example, the total DAI in the DCI that schedules data in a predetermined time unit (for example, PDCCH monitoring occasion) within the predetermined period may indicate the total number of pieces of data scheduled up to the predetermined time unit (also referred to as a point, timing, or the like) within the predetermined period.

The terminal 20 may transmit one or more HARQ-ACK bits, which are determined (generated) based on the above-described Type I or Type II HARQ-ACK codebook, using at least one of the uplink control channel (Physical Uplink Control Channel (PUCCH)) and the uplink shared channel (Physical Uplink Shared Channel (PUSCH)).

In the case of the Type I HARQ-ACK codebook, the terminal 20 generates a number of HARQ-ACK bits, the number being corresponding to the number of PDCCH/PDSCH transmission candidates, which may be transmitted from the base station 10, instead of the number of actual PDCCH/PDSCH transmissions from the base station 10. That is, for the PDCCH/PDSCH transmission occasions in which the PDCCH/PDSCH may be transmitted from the base station 10, the terminal 20 transmits the HARQ-ACK bits regardless of whether the PDCCH/PDSCH is actually transmitted from the base station 10. For example, for a PDCCH transmission occasion from the base station 10, when the PDCCH transmission from the base station 10 is not performed, the terminal 20 may transmit NACK.

Figure 3:
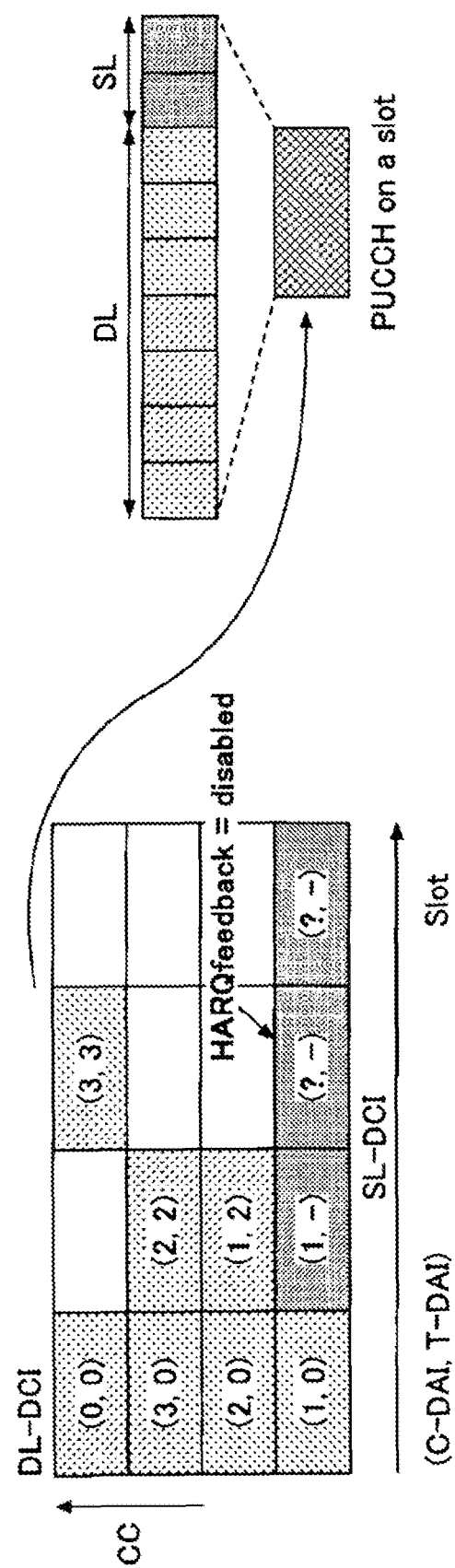
FIG. 3 is a diagram illustrating an example of a Type II HARQACK codebook.

In the case of the Type II HARQ-ACK codebook, the terminal 20 generates a number of HARQ-ACK bits, the number being corresponding to the number of PDCCH/PDSCH signals that are supposed to be actually transmitted from the base station 10. In addition, because the terminal 20 may be unable to receive the PDCCH signal from the base station 10, the DAI is included in the DCI so that the base station 10 can indicate, to the terminal 20, the number of PDCCH signals transmitted from the base station 10. For example, as illustrated at the left end of FIG. 3, even if the terminal 20 is unable to detect the DL DCI indicated by (3, 0) among the DL DCIs indicated by (1, 0), (2, 0), (3, 0), and (0, 0), because the terminal 20 detects the DL DCI indicated by (2, 0) and the DL DCI indicated by (0, 0), the terminal 20 can determine that there is (3, 0) between (2, 0) and (0, 0), configure the HARQ-ACK bit corresponding to (3, 0) to NACK, and transmit the configured HARQ-ACK bit. Thus, in the Type II HARQ-ACK codebook, the number of HARQ-ACK bits transmitted from the terminal 20 can be made to be the same as the number of HARQ-ACK bits assumed on the base station 10 side.

(Regarding Issues)

In order for the terminal 20 to support a function of transmitting the SL HARQ-ACK to the base station 10 (gNB), there are still items to be considered.

For example, the operation of the terminal 20 when receiving an SL grant, which does not require HARQ feedback to the base station 10 (gNB), is unknown. As such an example, a case where HARQ feedback is not performed for the sidelink transmission (for example, the case of broadcast transmission and the case of unicast transmission in which many blind retransmissions are performed) can be considered. Thus, when HARQ feedback on the sidelink is not performed, it is considered that transmission of SL HARQ-ACK to the base station 10 (gNB) is unnecessary.

As described above, because a case, where the feedback of the SL HARQ to the base station 10 is unnecessary, is assumed, the inclusion of an indication in information has also been discussed, wherein the indication enables/disables the function of SL HARQ feedback to the base station 10, and wherein the information is related to Downlink Control Information for sidelink scheduling (SL DCI) (for example: a field in SL DCI; RNTI for scrambling CRC of SL DCI; and PDCCH monitoring occasion/Search space/CCE for detecting SL DCI). Alternatively, the indication may be provided by the upper layer signal link (for example, RRC parameter and MAC CE). For example, when the indication is transmitted by the SL DCI, the terminal 20, to which the DCI including the information for enabling the function of SL HARQ feedback to the base station 10 is indicated, may transmit the SL HARQ-ACK bit corresponding to the DCI to the base station 10. It is assumed that the terminal 20, to which information disabling the function of SL HARQ feedback to the base station 10 is indicated, does not basically perform an operation of indicating SL HARQ-ACK to the base station 10. However, the details of the operation of the terminal 20, to which the information that disables the function of SL HARQ feedback to the base station 10 is indicated, are unknown at this point in time.

In addition, as the operation of the terminal 20 when the indication of enable/disable of the function of SL HARQ feedback to the base station 10 is included in the information related to the SL DCI, it is necessary to consider each of: a case where the HARQ-ACK codebook is Type I; and a case where the HARQ-ACK codebook is Type II.

For example, in the case of the Type II codebook, it is unknown how to configure the Downlink Assignment Indicator (DAI) field that can be used when determining the number of bits of the Type II HARQ-ACK codebook. For example, it is unknown how to configure the DAI included in the SL DCI related to the indication that disables the function of SL HARQ feedback to the base station 10. In addition, it is unknown how to configure the DAI included in the SL DCI related to the indication that enables the function of SL HARQ feedback to the base station 10 thereafter. In addition, the DAI may be called by another name. For example, the DAI may be called Sidelink Scheduling Indicator (Index) (SSI), but is not limited to this.

For example, in the case of the Type I codebook, it is assumed that the terminal 20 returns HARQ-ACK for the PSSCHs at all timings at which sidelink transmissions, for example, Physical Sidelink Shared Channels (PSSCHs), may occur. In this case, the operation of the terminal 20 when the function of SL HARQ feedback to the base station 10 is disabled, is unknown.

(Highest Proposal)

When information that disables the function of SL HARQ feedback to the base station 10 is indicated to the terminal 20, the terminal 20 may perform a specific operation (for example, operations of Proposals 1 to 3 below) on the HARQ feedback.

(Proposal 1)

In Proposal 1, it is assumed that the terminal 20 transmits the SL HARQ-ACK bit to the base station according to the Type II HARQ-ACK codebook. When information that disables the function of SL HARQ feedback to the base station 10 is indicated to the terminal 20, the terminal 20 may assume that the DAI value in the specific SL DCI is based on a specific value.

(1A-1)

The specific SL DCI described above may be an SL DCI for indicating that the function of SL HARQ feedback to the base station 10 is to be disabled. In the following (1B-1) to (1B-4), it may be assumed that the specific SL DCI described above is an SL DCI for indicating that the function of SL HARQ feedback to the base station 10 is to be disabled.

(1B-1)

The DAI value in the SL DCI for indicating that the function of SL HARQ feedback to the base station 10 is to be disabled, may be, for example, a DAI value in an SL DCI transmitted from the base station 10 immediately before the SL DCI for indicating that the function of SL HARQ feedback to the base station 10 is to be disabled. In addition, according to an embodiment of the invention, "immediately before" may mean before one SL DCI index. That is, when a plurality of SL DCIs are transmitted and received in the same PDCCH monitoring occasion, one previous SL DCI may be meant based on the order defined for the plurality of SL DCIs. For example, when the terminal 20 receives SL DCI #0 in the PDCCH monitoring occasion #m−1 and the terminal 20 receives SL DCI #1 and SL DCI #2 in the PDCCH monitoring occasion #m, the SL DCI immediately before the SL DCI #1 may be the SL DCI #0, or may be the SL DCI #1 immediately before the SL DCI #2.

Figure 4:
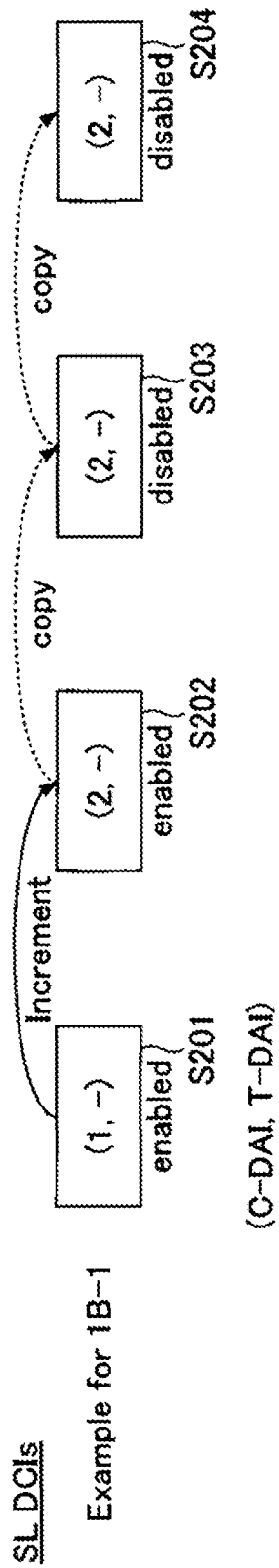
FIG. 4 is a diagram illustrating an example of a method of 1B-1.

FIG. 4 is a diagram illustrating an example of (1B-1). In step S201, the terminal 20 receives the SL DCI for indicating that the function of SL HARQ feedback to the base station 10 is to be enabled. The value of the DAI included in the SL DCI received by the terminal 20 in step S201 is "1". In step S202, the terminal 20 receives the SL DCI for indicating that the function of SL HARQ feedback to the base station 10 is to be enabled. The value of the DAI included in the SL DCI received by the terminal 20 in step S202 is "2". In step S203, the terminal 20 receives the SL DCI for indicating that the function of SL HARQ feedback to the base station 10 is to be disabled. The value of the DAI included in the SL DCI received by the terminal 20 in step S203 is "2", which is the DAI value in the SL DCI received by the terminal 20 in step S202. In step S204, the terminal 20 receives the SL DCI for indicating that the function of SL HARQ feedback to the base station 10 is to be disabled. The value of the DAI included in the SL DCI received by the terminal 20 in step S204 is "2", which is the DAI value in the SL DCI received by the terminal 20 in step S203. In addition, although only C-DAI is indicated in FIG. 4 and subsequent diagrams, T-DAI may also be indicated.

(1B-2)

Figure 5:
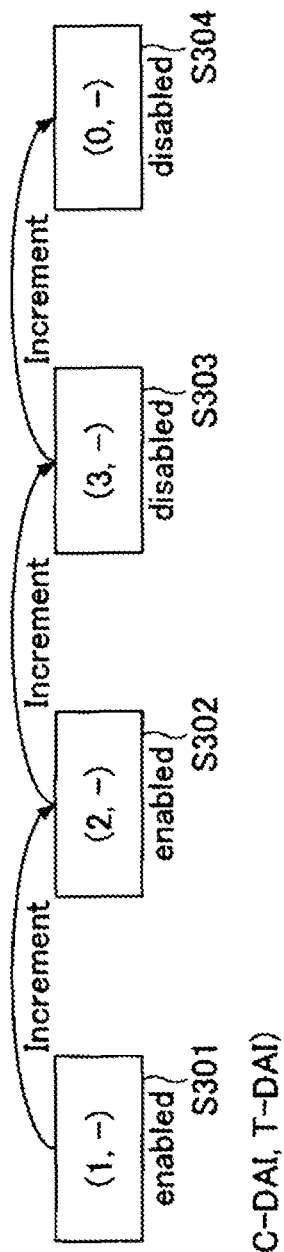
FIG. 5 is a diagram illustrating an example of a method of 1B-2.

The DAI value in the SL DCI for indicating that the function of SL HARQ feedback to the base station 10 is to be disabled, may be, for example, a value incremented from a DAI value in an SL DCI transmitted from the base station 10 immediately before the SL DCI for indicating that the function of SL HARQ feedback to the base station 10 is to be disabled. FIG. 5 is a diagram illustrating an example of (1B-2). In step S301, the terminal 20 receives the SL DCI for indicating that the function of SL HARQ feedback to the base station 10 is to be enabled. The value of the DAI included in the SL DCI received by the terminal 20 in step S301 is "1". In step S302, the terminal 20 receives the SL DCI for indicating that the function of SL HARQ feedback to the base station 10 is to be enabled. The value of the DAI included in the SL DCI received by the terminal 20 in step S302 is "2". In step S303, the terminal 20 receives the SL DCI for indicating that the function of SL HARQ feedback to the base station 10 is to be disabled. The value of the DAI included in the SL DCI received by the terminal 20 in step S303 is "3", which is the value incremented from "2" that is a DAI value in the SL DCI received by the terminal 20 in step S302. In step S304, the terminal 20 receives the SL DCI for indicating that the function of SL HARQ feedback to the base station 10 is to be disabled. The value of the DAI included in the SL DCI received by the terminal 20 in step S304 is "0", which is the value incremented from "3" that is a DAI value in the SL DCI received by the terminal 20 in step S303. In addition, although the DAI is assumed to be 2 bits in the present embodiment, the DAI is not limited to this. In the case of 2 bits, a modulo operation may be applied in the increment from "3" to become "0".

(1B-3)

The DAI value in the SL DCI for indicating that the function of SL HARQ feedback to the base station 10 is to be disabled, may be, for example, a DAI value in an SL DCI transmitted from the base station 10 immediately before the SL DCI for indicating that the function of SL HARQ feedback to the base station 10 is to be disabled, among the SL DCIs for indicating that the function of SL HARQ feedback to the base station 10 is to be enabled.

Figure 6:
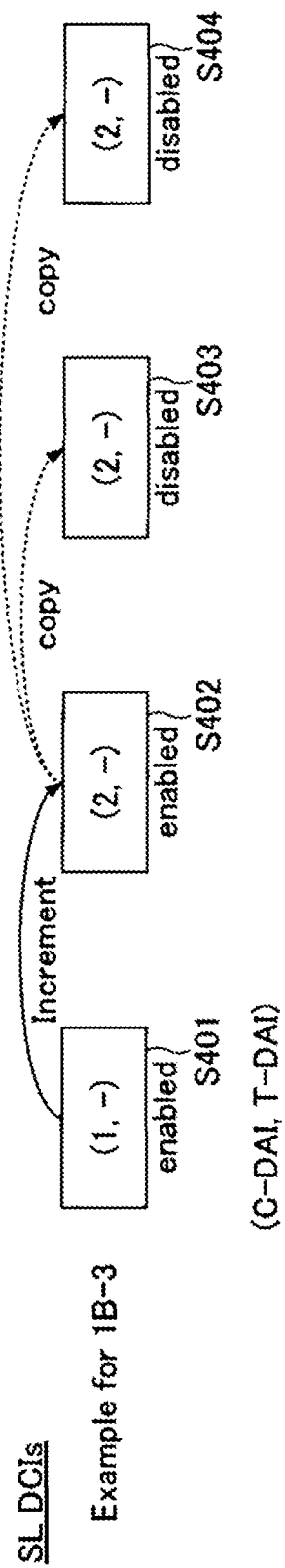
FIG. 6 is a diagram illustrating an example of a method of 1B-3.

FIG. 6 is a diagram illustrating an example of (1B-3). In step S401, the terminal 20 receives the SL DCI for indicating that the function of SL HARQ feedback to the base station 10 is to be enabled. The value of the DAI included in the SL DCI received by the terminal 20 in step S401 is "1". In step S402, the terminal 20 receives the SL DCI for indicating that the function of SL HARQ feedback to the base station 10 is to be enabled. The value of the DAI included in the SL DCI received by the terminal 20 in step S402 is "2". In step S403, the terminal 20 receives the SL DCI for indicating that the function of SL HARQ feedback to the base station 10 is to be disabled. The value of the DAI included in the SL DCI received by the terminal 20 in step S403 is "2", which is the DAI value in the SL DCI received by the terminal 20 in step S402. In step S404, the terminal 20 receives the SL DCI for indicating that the function of SL HARQ feedback to the base station 10 is to be disabled. The value of the DAI included in the SL DCI received by the terminal 20 in step S404 is "2", which is the DAI value in the SL DCI received by the terminal 20 in step S402.

(1B-4)

The DAI value in the SL DCI for indicating that the function of SL HARQ feedback to the base station 10 is to be disabled, may be, for example, a value incremented from the DAI value in an SL DCI transmitted from the base station 10 immediately before the SL DCI for indicating that the function of SL HARQ feedback to the base station 10 is to be disabled, among the SL DCIs for indicating that the function of SL HARQ feedback to the base station 10 is to be enabled.

Figure 7:
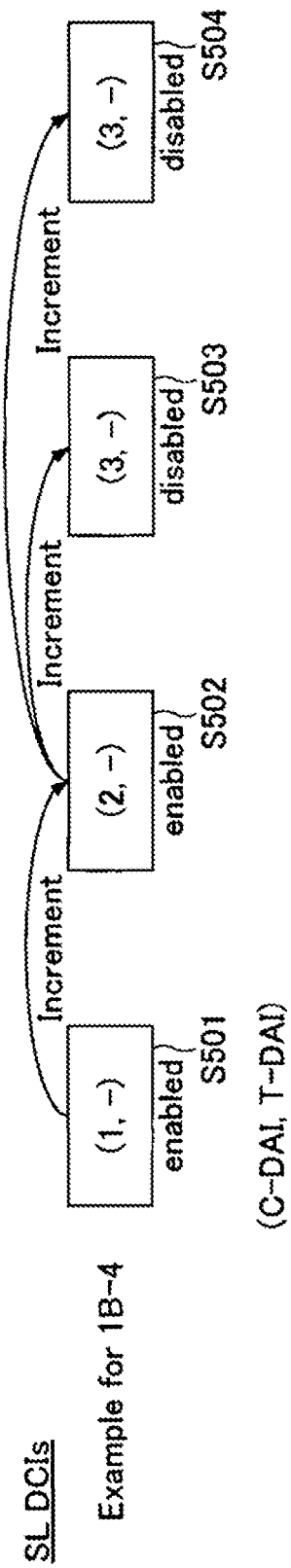
FIG. 7 is a diagram illustrating an example of a method of 1B-4.

FIG. 7 is a diagram illustrating an example of (1B-4). In step S501, the terminal 20 receives the SL DCI for indicating that the function of SL HARQ feedback to the base station 10 is to be enabled. The value of the DAI included in the SL DCI received by the terminal 20 in step S501 is "1". In step S502, the terminal 20 receives the SL DCI for indicating that the function of SL HARQ feedback to the base station 10 is to be enabled. The value of the DAI included in the SL DCI received by the terminal 20 in step S502 is "2". In step S503, the terminal 20 receives the SL DCI for indicating that the function of SL HARQ feedback to the base station 10 is to be disabled. The value of the DAI included in the SL DCI received by the terminal 20 in step S503 is "3", which is the value incremented from "2" that is a DAI value in the SL DCI received by the terminal 20 in step S502. In step S504, the terminal 20 receives the SL DCI for indicating that the function of SL HARQ feedback to the base station 10 is to be disabled. The value of the DAI included in the SL DCI received by the terminal 20 in step S504 is the value "3" incremented from "2" that is the DAI value in the SL DCI received by the terminal 20 in step S502.

(Proposal 1')

In Proposal 1', it is assumed that the terminal 20 transmits the SL HARQ-ACK bit according to the Type II HARQ-ACK codebook. The terminal 20 that receives the SL DCI may assume that the value of DAI/uplink (UL)-DAI is set based on at least one of the SL DCI for indicating that the function of SL HARQ feedback to the base station 10 is to be enabled and the SL DCI for indicating that the function of SL HARQ feedback to the base station 10 is to be disabled.

(1'-1)

The terminal 20 that receives the SL DCI may assume that the value of DAI/uplink (UL)-DAI is set based only on the SL DCI for indicating that the function of SL HARQ feedback to the base station 10 is to be enabled. That is, when an indication that enables the function of SL HARQ feedback to the base station 10 is provided in an SL DCI and an indication that disables the function of SL HARQ feedback to the base station 10 is provided in an SL DCI immediately therebefore, the terminal 20 may further go back and assume that the DAI is determined based on the SL DCI for indicating that the function of SL HARQ feedback to the base station 10 is to be enabled. In a case where a grant (UL grant) that schedules the UL transmission is received and the SL DCI indicating the PUCCH, which collides with the PUSCH scheduled by the UL grant at least in the time domain, is received, when the SL DCI for indicating that the function of SL HARQ feedback to the base station 10 is to be enabled is not transmitted from the base station, the UL-DAI in the UL grant may be a value by which the HARQ feedback is not expected. That is, when only the SL-DCI for indicating that the function of SL HARQ feedback to the base station 10 is to be disabled, is transmitted from the base station, the value of the UL-DAI in the UL grant may be a value ignoring the SL-DCI.

Figure 8:
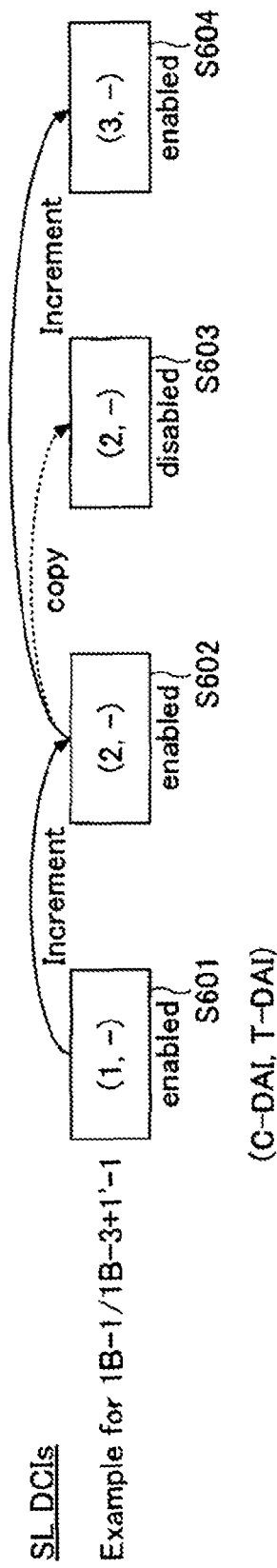
FIG. 8 is a diagram illustrating an example in which a method of 1'-1 is combined with the method of 1B-1 or the method of 1B-3.

FIG. 8 is a diagram illustrating an example in which (1'-1) is combined with (1B-1) or (1B-3). In step S601, the terminal 20 receives the SL DCI for indicating that the function of SL HARQ feedback to the base station 10 is to be enabled. The value of the DAI included in the SL DCI received by the terminal 20 in step S601 is "1". In step S602, the terminal 20 receives the SL DCI for indicating that the function of SL HARQ feedback to the base station 10 is to be enabled. The value of the DAI included in the SL DCI received by the terminal 20 in step S602 is "2". In step S603, the terminal 20 receives the SL DCI for indicating that the function of SL HARQ feedback to the base station 10 is to be disabled. The value of the DAI included in the SL DCI received by the terminal 20 in step S603 is "2", which is the DAI value in the SL DCI received by the terminal 20 in step S602. In step S604, the terminal 20 receives the SL DCI for indicating that the function of SL HARQ feedback to the base station 10 is to be enabled. The value of the DAI included in the SL DCI received by the terminal 20 in step S604 is "3", which is the value incremented from "2" that is a DAI value in the SL DCI received by the terminal 20 in step S602.

(1'-2)

The terminal 20 that receives the SL DCI may assume that the value of DAI/uplink (UL)-DAI is set based on the SL DCI for indicating that the function of SL HARQ feedback to the base station 10 is to be enabled and the SL DCI for indicating that the function of SL HARQ feedback to the base station 10 is to be disabled. That is, when an indication that enables the function of SL HARQ feedback to the base station 10 is provided in an SL DCI and an indication that disables the function of SL HARQ feedback to the base station 10 is provided in an SL DCI immediately therebefore, the terminal 20 may assume that the DAI is determined based on the SL DCI for indicating that the function of SL HARQ feedback to the base station 10 is to be disabled.

Figure 9:
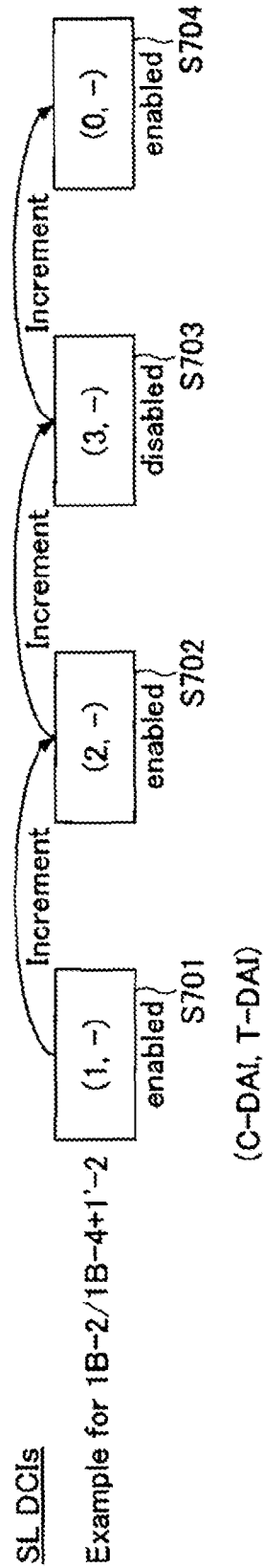
FIG. 9 is a diagram illustrating an example in which a method of 1'-2 is combined with the method of 1B-2 or the method of 1B-4.

FIG. 9 is a diagram illustrating an example in which (1'-2) is combined with (1B-2) or (1B-4). In step S701, the terminal 20 receives the SL DCI for indicating that the function of SL HARQ feedback to the base station 10 is to be enabled. The value of the DAI included in the SL DCI received by the terminal 20 in step S701 is "1". In step S702, the terminal 20 receives the SL DCI for indicating that the function of SL HARQ feedback to the base station 10 is to be enabled. The value of the DAI included in the SL DCI received by the terminal 20 in step S702 is "2". In step S703, the terminal 20 receives the SL DCI for indicating that the function of SL HARQ feedback to the base station 10 is to be disabled. The value of the DAI included in the SL DCI received by the terminal 20 in step S703 is "3", which is the value incremented from "2" that is a DAI value in the SL DCI received by the terminal 20 in step S702. In step S704, the terminal 20 receives the SL DCI for indicating that the function of SL HARQ feedback to the base station 10 is to be enabled. The value of the DAI included in the SL DCI received by the terminal 20 in step S704 is "0", which is the value incremented from "3" that is a DAI value in the SL DCI received by the terminal 20 in step S703.

(Proposal 1")

The terminal 20 may generate a HARQ-ACK codebook based on the DAI value according to one of the methods (1B-1) to (1B-4) and (1'-1) to (1'-2) described above and perform SL HARQ feedback to the base station 10 using the generated HARQ-ACK codebook.

For example, in the example in which (1'-1) is combined with (1B-1) or (1B-3), for the SL HARQ feedback to the base station 10, only the SL HARQ-ACK bit corresponding to the SL DCI for indicating that the function of SL HARQ feedback to the base station 10 is to be enabled is generated.

In this case, the number of SL DCIs for indicating that the function of SL HARQ feedback to the base station 10 is to be enabled may be calculated based on the DAI of the SL DCI. For example, in the example illustrated in FIG. 8, even if the terminal 20 cannot receive the SL DCI for indicating that the function of SL HARQ feedback to the base station 10 is to be enabled in step S602, the terminal 20 can detect that the SL DCI for indicating that the function of SL HARQ feedback to the base station 10 is to be enabled is being transmitted in step S602 since the value of the DAI included in the SL DCI for indicating that the function of SL HARQ feedback to the base station 10 is to be disabled, which is received in step S603, is 2.

For example, in the example in which (1'-2) is combined with (1B-2) or (1B-4), for the SL HARQ feedback to the base station 10, the SL HARQ-ACK bit corresponding to the SL DCI for indicating that the function of SL HARQ feedback to the base station 10 is to be enabled and the SL DCI for indicating that the function of SL HARQ feedback to the base station 10 is to be disabled, is generated. In this case, the number of SL DCIs for indicating that the function of SL HARQ feedback to the base station 10 is to be enabled and the number of SL DCIs for indicating that the function of SL HARQ feedback to the base station 10 is to be disabled, may be calculated based on the DAI of the SL DCI.

In addition, the SL HARQ-ACK bit corresponding to the SL DCI for indicating that the function of SL HARQ feedback to the base station 10 is to be disabled, may be transmitted to the base station 10 only when multiplexed with the SL HARQ-ACK bit corresponding to the SL DCI for indicating that the function of SL HARQ feedback to the base station 10 is to be enabled. In addition, the SL HARQ-ACK bit corresponding to the SL DCI for indicating that the function of SL HARQ feedback to the base station 10 is to be disabled, may always be ACK.

According to the methods of (Proposal 1) to (Proposal 1") described above, a mutual understanding can be obtained between the base station 10 and the terminal 20 for the handling of the HARQ-ACK corresponding to the SL DCI for indicating that the function of SL HARQ feedback to the base station 10 is to be disabled. For example, when returning only the SL HARQ-ACK corresponding to the SL DCI for indicating that the function of SL HARQ feedback to the base station 10 is to be enabled, it is possible to reduce the number of bits. In addition, the detection error of SL DCI for indicating that the function of SL HARQ feedback to the base station 10 is to be enabled can be detected by the DAI in the SL DCI for indicating that the function of SL HARQ feedback to the base station 10 is to be disabled. In addition, for example, when returning the SL HARQ-ACK corresponding to the SL DCI for indicating that the function of SL HARQ feedback to the base station 10 is to be disabled in addition to the SL HARQ-ACK corresponding to the SL DCI for indicating that the function of SL HARQ feedback to the base station 10 is to be enabled, it is not necessary to mount the additional terminal 20. Therefore, the complexity of mounting the terminal 20 is reduced.

(Proposal 2)

In Proposal 2, it is assumed that the terminal 20 transmits the SL HARQ-ACK bit according to the Type I HARQ-ACK codebook. When information that disables the function of SL HARQ feedback to the base station 10, is indicated to the terminal 20, the terminal 20 may uses the HARQ-ACK feedback corresponding to a specific SL DCI as ACK.

(1A-1)

The specific SL DCI described above may be an SL DCI for indicating that the function of SL HARQ feedback to the base station 10 is to be disabled. In addition, the SL HARQ-ACK bit corresponding to the SL DCI for indicating that the function of SL HARQ feedback to the base station 10 is to be disabled, may be transmitted to the base station 10 only when multiplexed with the SL HARQ-ACK bit corresponding to the SL DCI for indicating that the function of SL HARQ feedback to the base station 10 is to be enabled. In a case where a UL grant is received and the SL DCI indicating the PUCCH, which collides with the PUSCH scheduled by the UL grant at least in the time domain, is received, the UL-DAI in the UL grant may be a value by which HARQ-ACK on PUSCH transmission is expected only when multiplexed with the SL HARQ-ACK bit corresponding to the SL DCI for indicating that the function of SL HARQ feedback to the base station 10 is to be enabled. According to the method of (Proposal 2) described above, a mutual understanding can be obtained between the base station 10 and the terminal 20 for the handling of the HARQ-ACK corresponding to the SL DCI for indicating that the function of SL HARQ feedback to the base station 10 is to be disabled.

(Proposal 3)

It may be assumed that the terminal 20 does not receive an instruction to transmit, at the same timing, the HARQ-ACK bit corresponding to the SL DCI for indicating that the function of SL HARQ feedback to the base station 10 is to be enabled and the HARQ-ACK bit corresponding to the SL DCI for indicating that the function of SL HARQ feedback to the base station 10 is to be disabled. That is, the terminal 20 may assume that the same feedback slot is not indicated: in the SL DCI for indicating that the function of SL HARQ feedback to the base station 10 is to be enabled; and in the SL DCI for indicating that the function of SL HARQ feedback to the base station 10 is to be disabled. The information that disables the function of SL HARQ feedback to the base station 10, may be indicated to the terminal 20 based on at least one of Feedback slot indication/PUCCH resource indication/DAI. In this case, the terminal 20 may ignore the value of the field indicating the feedback slot when generating the HARQ-ACK codebook. According to the method of (Proposal 3) described above, a mutual understanding can be obtained between the base station 10 and the terminal 20 for the number of SL HARQ-ACK bits.

(Device Configuration)

Next, functional configuration examples of the base station 10 and the terminal 20 that execute the processes and the operations described so far will be described.

<Base Station 10>

Figure 10:
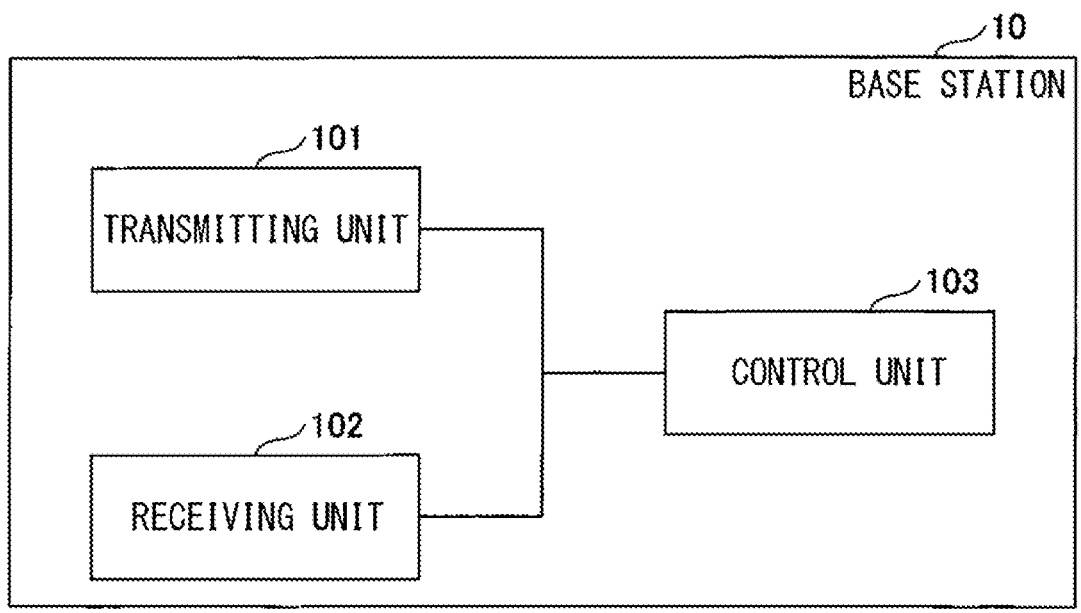
FIG. 10 is a diagram illustrating an example of the functional configuration of a base station according to an embodiment.

FIG. 10 is a diagram illustrating an example of the functional configuration of the base station 10. As illustrated in FIG. 10, the base station 10 includes a transmitting unit 101, a receiving unit 102, and a control unit 103. The functional configuration illustrated in FIG. 10 is merely an example. As long as the operation according to the present embodiment can be performed, any functional division and any name of each functional unit may be applied. In addition, the transmitting unit 101 may be referred to as a transmitter, and the receiving unit 102 may be referred to as a receiver.

The transmitting unit 101 has a function of generating a signal to be transmitted to the terminal 20 and transmitting the signal wirelessly. The receiving unit 102 has a function of receiving various signals transmitted from the terminal 20 and acquiring, for example, information of higher layers from the received signals. In addition, the receiving unit 102 includes a function of measuring the received signal to acquire a quality value.

The control unit 103 controls the base station 10. In addition, the function of the control unit 103 related to transmission may be included in the transmitting unit 101, and the function of the control unit 103 related to reception may be included in the receiving unit 102.

For example, the control unit 103 of the base station 10 sets a resource for sidelink communication for the terminal 20 and generates a message for specifying the set resource for sidelink communication, and the transmitting unit 101 transmits the message to the terminal 20.

For example, the receiving unit 102 of the base station 10 receives the HARQ-ACK transmitted from the terminal 20. When the HARQ-ACK received by the receiving unit 102 is NACK, the control unit 103 may set a resource for retransmission on the sidelink by the terminal 20 and generate a message for specifying the set resource for retransmission on the sidelink, and the transmitting unit 101 may transmit the message to the terminal 20.

<Terminal 20>

Figure 11:
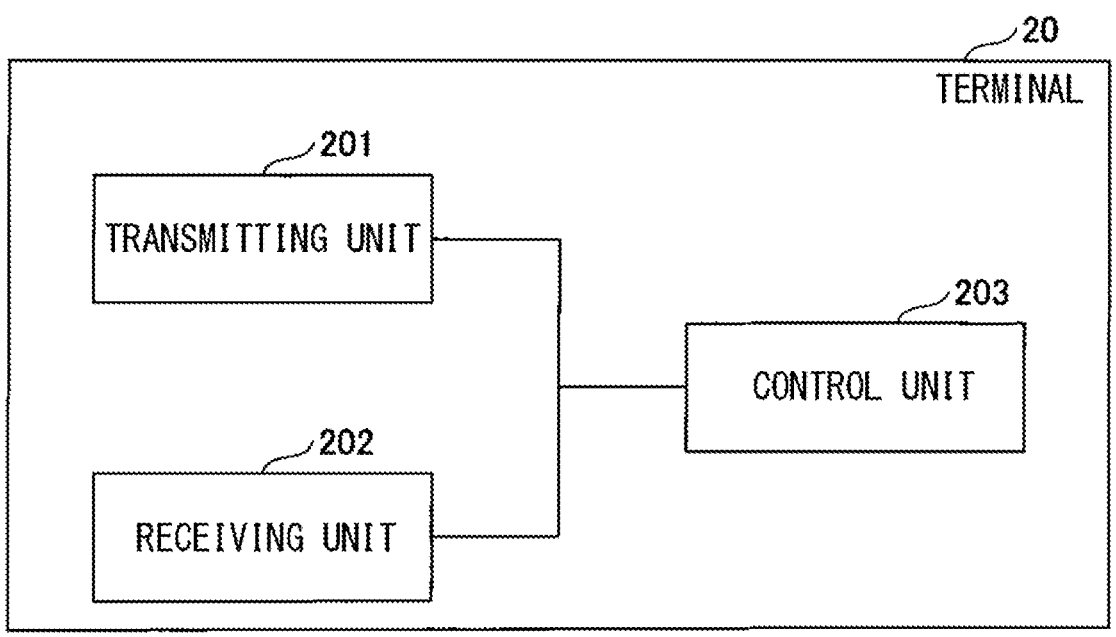
FIG. 11 is a diagram illustrating an example of the functional configuration of a terminal according to an embodiment.

FIG. 11 is a diagram illustrating an example of the functional configuration of the terminal 20. As illustrated in FIG. 11, the terminal 20 includes a transmitting unit 201, a receiving unit 202, and a control unit 203. The functional configuration illustrated in FIG. 11 is merely an example. As long as the operation according to the present embodiment can be performed, any functional division and any name of each functional unit may be applied. In addition, the transmitting unit 201 may be referred to as a transmitter, and the receiving unit 202 may be referred to as a receiver. In addition, the terminal 20 may be the transmitting side terminal 20A, or may be the receiving side terminal 20B. In addition, the terminal 20 may be the scheduling terminal 20.

The transmitting unit 201 generates a transmission signal from transmission data, and transmits the transmission signal wirelessly. The receiving unit 202 wirelessly receives various signals, and acquires a higher-layer signal from the received physical layer signal. In addition, the receiving unit 202 includes a function of measuring the received signal to acquire a quality value.

The control unit 203 controls the terminal 20. In addition, the function of the control unit 203 related to transmission may be included in the transmitting unit 201, and the function of the control unit 203 related to reception may be included in the receiving unit 202.

For example, the receiving unit 202 of the terminal 20 receives a signal including an upper layer parameter including the setup information of the resource for sidelink transmission transmitted from the base station 10, the control unit 203 of the terminal 20 sets the resource according to the setup information included in the received upper layer parameter, and the transmitting unit 201 of the terminal 20 performs sidelink data transmission using the set resource.

For example, the receiving unit 202 of the terminal 20 receives the sidelink HARQ-ACK transmitted from the receiving side terminal 20. In response to the reception of the sidelink HARQ-ACK by the receiving unit 202, the transmitting unit 201 transmits the HARQ-ACK to the base station 10.

For example, the control unit 203 of the terminal 20 may perform a specific operation (for example, operations of Proposals 1 to 3 described above) for the HARQ feedback when the indication that the function of SL HARQ feedback to the base station 10 is to be disabled, is provided.

<Hardware Configuration>

The block diagrams (FIGS. 10 and 11) used in the description of the above embodiment illustrate blocks in functional units. These functional blocks (configuration units) are realized by any combination of at least one of hardware and software. In addition, a method of realizing each functional block is not particularly limited. That is, each functional block may be realized using one physically or logically coupled device, or may be realized by connecting two or more physically or logically separated devices directly or indirectly (for example, using a wired or radio connection) and using the plurality of devices. Each functional block may be realized by combining the above-described one device or the above-described plurality of devices with software. Functions include determining, judging, calculating, computing, processing, deriving, investigating, searching, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuration unit) that makes the transmission work is called a transmitting unit or a transmitter. In any case, as described above, the realization method is not particularly limited.

Figure 12:
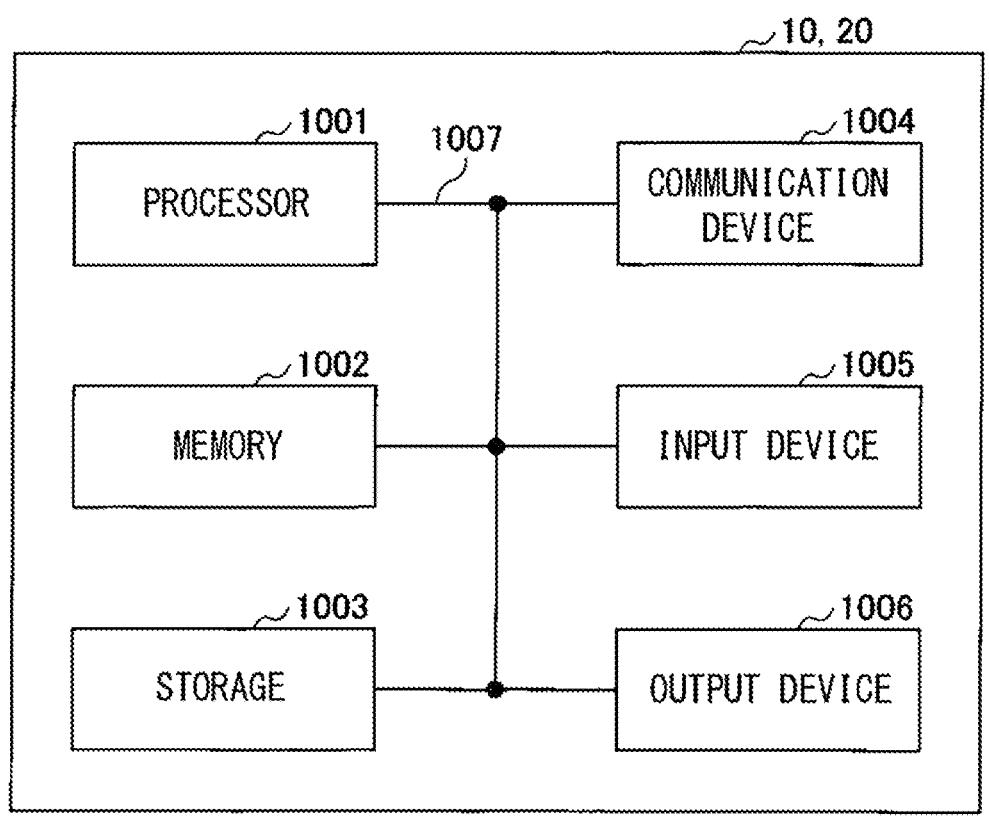
FIG. 12 is a diagram illustrating an example of the hardware configuration of a base station and a terminal according to an embodiment.

In addition, for example, both the terminal 20 and the base station 10 according to the embodiment of the invention may function as a computer that performs the processing according to the present embodiment. FIG. 12 is a diagram illustrating an example of the hardware configuration of the terminal 20 and the base station 10 according to the present embodiment. Each of the terminal 20 and the base station 10 described above may be physically configured as a computer apparatus including a processor 1001, a memory 1002, a storage 1003, a terminal 1004, an input device 1005, an output device 1006, a bus 1007, and the like.

In addition, in the following description, the term "device" can be read as a circuit, a unit, and the like. The hardware configuration of each of the terminal 20 and the base station 10 may be configured to include one or more devices for each of the devices indicated by 1001 to 1006 illustrated in the diagram, or may be configured not to include some devices.

Each function in the terminal 20 and the base station 10 is realized by reading predetermined software (program) onto hardware, such as the processor 1001 and the memory 1002, so that the processor 1001 performs an operation and controlling communication by the terminal 1004 or controlling at least one of reading and writing of data in the memory 1002 and the storage 1003.

The processor 1001 controls the entire computer by operating an operating system, for example. The processor 1001 may be configured by a central processing unit (CPU) including an interface with peripheral equipment, a control device, an operation device, a register, and the like.

In addition, the processor 1001 reads a program (program code), a software module, data, and the like into the memory 1002 from at least one of the storage 1003 and the communication terminal 1004, and executes various kinds of processing according to these. As the program, a program causing a computer to execute at least a part of the operation described in the above embodiment is used. For example, the control unit 203 of the terminal 20 may be implemented by a control program stored in the memory 1002 and operating in the processor 1001, or may be implemented similarly for other functional blocks. Although it has been described that the various kinds of processing described above are executed by one processor 1001, the various kinds of processing described above may be executed simultaneously or sequentially by two or more processors 1001. The processor 1001 may be implemented by one or more chips. In addition, the program may be transmitted from a network through a telecommunication line.

The memory 1002 is a computer-readable recording medium, and may be configured by at least one of, for example, a ROM (Read Only Memory), an EPROM (Erasable Programmable ROM), an EEPROM (Electrically Erasable Programmable ROM), and a RAM (Random Access Memory). The memory 1002 may be called a register, a cache, a main memory, and the like. The memory 1002 can store a program (program code), a software module, and the like that can be executed to execute the radio communication method according to an embodiment of the present disclosure.

The storage 1003 is a computer-readable recording medium, and may be configured by at least one of, for example, an optical disk such as a CD-ROM (Compact Disc ROM), a hard disk drive, a flexible disk, and a magneto-optical disk (for example, a compact disk, a digital versatile disk, and a Blu-ray (Registered trademark) disk), a smart card, a flash memory (for example, a card, a stick, a key drive), a floppy (registered trademark) disk, and a magnetic strip. The storage 1003 may be called an auxiliary storage device. The storage medium described above may be, for example, a database including at least one of the memory 1002 and the storage 1003, a server, or other appropriate media.

The communication terminal 1004 is hardware (transmitting and receiving device) for performing communication between computers through at least one of a wired network and a radio network, and is also referred to as, for example, a network device, a network controller, a network card, and a communication module. The communication terminal 1004 may be configured to include, for example, a high-frequency switch, a duplexer, a filter, a frequency synthesizer, and the like in order to realize at least one of frequency division duplex (FDD) and time division duplex (TDD), for example.

The input device 1005 is an input device (for example, a keyboard, a mouse, a microphone, a switch, a button, and a sensor) for receiving an input from the outside. The output device 1006 is an output device (for example, a display, a speaker, and an LED lamp) that performs output to the outside. In addition, the input device 1005 and the output device 1006 may be integrated (for example, a touch panel).

In addition, respective devices, such as the processor 1001 and the memory 1002, are connected to each other by the bus 1007 for communicating information. The bus 1007 may be configured using a single bus, or may be configured using a different bus for each device.

In addition, each of the terminal 20 and the base station 10 may be configured to include hardware, such as a microprocessor, a digital signal processor (DSP), an ASIC (Application Specific Integrated Circuit), a PLD (Programmable Logic Device), and an FPGA (Field Programmable Gate Array), and some or all of the functional blocks may be realized by the hardware. For example, the processor 1001 may be implemented using at least one of these hardware components.

Summary of Embodiment

In this specification, at least the following terminal and communication method are disclosed.

A terminal includes: a receiving unit that receives specific sidelink control information related to an indication that disables a function of performing Hybrid Automatic Repeat Request (HARQ) feedback corresponding to a sidelink to a base station; and a control unit that performs a specific operation for the HARQ feedback in a case where the receiving unit receives the specific sidelink control information related to the indication.

According to the configuration described above, the operation of the terminal when transmitting SL HARQ-ACK to the base station is clarified.

In a case where the receiving unit receives the specific sidelink control information including the indication that disables the function of performing the HARQ feedback corresponding to the sidelink to the base station, the control unit may assume that a Downlink Assignment Indicator (DAI) value included in the specific sidelink control information is a value based on one of: a DAI value included in first sidelink control information transmitted from the base station immediately before the reception of the specific sidelink control information by the receiving unit; and a DAI value included in second sidelink control information received immediately before the reception the control information of the specific sidelink control information among one or more pieces of sidelink control information including an indication that enables the function of performing the HARQ feedback corresponding to the sidelink to the base station.

According to the configuration described above, a mutual understanding can be obtained between the base station and the terminal for the handling of the HARQ-ACK corresponding to the SL DCI for indicating that the function of SL HARQ feedback to the base station is to be disabled.

In a case where the receiving unit receives the specific sidelink control information including the indication that enables the function of performing the HARQ feedback corresponding to the sidelink to the base station, the control unit may assume that a Downlink Assignment Indicator (DAI) value included in the specific sidelink control information is a value based on one of: a DAI value included in first sidelink control information transmitted from the base station immediately before the reception of the specific sidelink control information by the receiving unit; and a DAI value included in second sidelink control information received immediately before the reception the specific sidelink control information among one or more pieces of sidelink control information including an indication that enables the function of performing the HARQ feedback corresponding to the sidelink to the base station.

According to the configuration described above, it is not necessary to perform additional mounting on the terminal, and the complexity of the terminal is reduced.

The control unit may generate, based on the DAI value, a HARQ-ACK codebook, which includes HARQ-Acknowledgement (HARQ-ACK) bits of a number of sidelinks corresponding to the DAI value.

According to the configuration described above, the number of HARQ-ACK bits included in the HARQ-ACK codebook is clarified.

The control unit may set one or more HARQ-Acknowledgement (HARQ-ACK) bits corresponding to control information of one or more sidelinks, which includes the indication that the function of performing the HARQ feedback corresponding to the sidelink to the base station is to be disabled, to a value corresponding to an acknowledgment (ACK).

According to the configuration described above, by setting the HARQ-ACK bit to ACK when the function of performing sidelink HARQ feedback to the base station is to be disabled, it is possible to prevent the base station from performing an operation when a NACK is received.

A communication method of a terminal includes: a step of receiving specific sidelink control information related to an indication that disables a function of performing Hybrid Automatic Repeat Request (HARQ) feedback corresponding to a sidelink to a base station; and a step of performing a specific operation for the HARQ feedback when the specific sidelink control information related to the indication is received.

According to the configuration described above, the operation of the terminal when transmitting SL HARQ-ACK to the base station is clarified.

Supplement to Embodiments

While the embodiments of the invention have been described above, the disclosed invention is not limited to such embodiments, and those skilled in the art will understand various variations, modifications, alternatives, substitutions, and the like. Although the description has been made using specific numerical examples to facilitate the understanding of the invention, those numerical values are merely examples and any appropriate values may be used unless otherwise specified. The division of the items in the above description is not essential to the invention, and the matters described in two or more items may be used in combination as necessary, or the matter described in a given item may be applied to the matter described in another item (unless there is a contradiction). The boundaries between functional units or processing units in the functional block diagrams do not always correspond to the boundaries between physical components. The operation of a plurality of functional units may be physically performed by one component, or the operation of one functional unit may be physically performed by a plurality of components. In the processing procedure described in the embodiment, the order of the processing may be changed as long as there is no contradiction.

Although the terminal 20 and the base station 10 have been described using functional block diagrams for convenience of description of the processing, such equipment may be realized by hardware, software, or a combination thereof. The software operated by the processor of the terminal 20 according to the embodiment of the invention and the software operated by the processor of the base station 10 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage media.

The indication of information is not limited to the aspect/embodiment described in the present disclosure, and may be performed using other methods. For example, the indication of information may be performed using physical layer signaling (for example, DCI (Downlink Control Information), UCI (Uplink Control Information)), higher layer signaling (for example, RRC (Radio Resource Control) signaling, MAC (Medium Access Control) signaling, broadcast information (MIB (Master Information Block), SIB (System Information Block))), other signals, or a combination thereof. In addition, the RRC signaling may be called an RRC message, and may be, for example, an RRC connection setup message or an RRC connection reconfiguration message.

Each aspect/embodiment described in the present disclosure may be applied to at least one of systems, which use LTE (Long Term Evolution), LTE-A (LTE-Advanced), SUPER 3G, IMT-Advanced, 4G (4th generation mobile communication system), 5G (5th generation mobile communication system), FRA (Future Radio Access), and NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and next-generation systems extended based on these. In addition, a plurality of systems may be combined (for example, a combination of 5G and at least one of LTE and LTE-A) to be applied.

In the processing procedure, sequence, flowchart, and the like in each aspect/embodiment described in the present disclosure, the order may be changed as long as there is no contradiction. For example, for the methods described in the present disclosure, elements of various steps are presented using an exemplary order, and the invention is not limited to the specific order presented.

The specific operation described as being performed by the base station 10 in the present disclosure may be performed by its upper node in some cases. In a network including one or more network nodes each having the base station 10, it is obvious that various operations performed for communication with a terminal can be performed by at least one of the base station 10 and other network nodes (for example, MME, S-GW, and the like can be considered, but the network node is not limited thereto) other than the base station 10. Although a case where the number of other network nodes other than the base station 10 is one has been exemplified above, a combination (for example, MME and S-GW) of a plurality of other network nodes may be applied.

Information or the like that is input and output may be stored in a specific place (for example, a memory) or may be managed using a management table. The information or the like that is input and output can be overwritten, updated, or added. The information or the like that is output may be deleted. The information or the like that is input may be transmitted to another device.

The judging may be performed based on a value expressed by 1 bit (0 or 1), may be performed based on Boolean (true or false), or may be performed by numerical value comparison (for example, comparison with a predetermined value).

Each aspect/embodiment described in the present disclosure may be used alone, may be used in combination, or may be switched and used according to execution. In addition, the indication of predetermined information (for example, indication of "X") is not limited to being explicitly performed, and may be performed implicitly (for example, without the indication of the predetermined information).

Software, regardless of whether this is called software, firmware, middleware, microcode, a hardware description language, or any other name, should be interpreted broadly to mean instructions, instruction sets, codes, code segments, program codes, programs, subprograms, software modules, applications, software applications, software packages, routines, subroutines, objects, executable files, execution threads, procedures, functions, and the like.

In addition, software, instructions, information, and the like may be transmitted and received through a transmission medium. For example, in a case where software is transmitted from a website, a server, or other remote sources using at least one of the wired technology (coaxial cable, optical fiber cable, twisted pair, digital subscriber line (DSL), and the like) and the radio technology (infrared, microwave, and the like), at least one of the wired technology and the radio technology is included within the definition of the transmission medium.

The information, signals, and the like described in the present disclosure may be expressed using any of a variety of different technologies. For example, data, instructions, commands, information, signals, bits, symbols, and chips that can be referred to throughout the above description may be represented by voltage, current, electromagnetic waves, magnetic field or magnetic particles, light field or photon, or any combination thereof.

In addition, the terms described in the present disclosure and the terms necessary for understanding the present disclosure may be replaced with terms having the same or similar meaning. For example, at least one of the channel and the symbol may be a signal (signaling). In addition, the signal may be a message.

The terms "system" and "network" used in the present disclosure are used interchangeably. In addition, the information, parameters, and the like described in the present disclosure may be expressed using an absolute value, may be expressed using a relative value from a predetermined value, or may be expressed using another corresponding information. For example, the radio resource may be indicated by an index.

The names used for the parameters described above are not limiting names in any way. In addition, equations and the like using these parameters may be different from those explicitly disclosed in the present disclosure. Since various channels (for example, a PUCCH and a PDCCH) and information elements can be identified by any suitable names, various names allocated to these various channels and information elements are not limiting names in any way.

In the present disclosure, terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", and "component carrier" can be used interchangeably. The base station may also be referred to as terms, such as a macro cell, a small cell, a femtocell, and a pico cell.

The base station can include one or more (for example, three) cells. When the base station includes a plurality of cells, the entire coverage area of the base station can be divided into a plurality of smaller areas, and each of the smaller area can also provide a communication service using a base station subsystem (for example, a remote radio head (RRH)). The term "cell" or "sector" refers to a part or the entirety of the coverage area of at least one of a base station and a base station subsystem that provides communication services in this coverage.

In the present disclosure, terms such as "mobile station (MS)", "user terminal", "user equipment (UE)", and "terminal" can be used interchangeably.

The mobile station may also be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms depending on those skilled in the art.

At least one of the base station and the mobile station may be called a transmitting device, a receiving device, a terminal, and the like. In addition, at least one of the base station and the mobile station may be a device mounted on a moving body, the moving body itself, and the like. The moving body may be a vehicle (for example, a car or an airplane), an unmanned moving body (for example, a drone or a self-driving car), or a robot (maned or unmanned). In addition, at least one of the base station and the mobile station necessarily includes a device that does not move during a communication operation. For example, at least one of the base station and the mobile station may be an IoT (Internet of Things) device, such as a sensor.

In addition, the base station in the present disclosure may be read as a user terminal. For example, each aspect/embodiment of the present disclosure may be applied to a configuration in which communication between a base station and a user terminal is replaced with communication between a plurality of user terminals (which may be called, for example, D2D (Device-to-Device) or V2X (Vehicle-to-Everything)). In this case, the user terminal 20 may have the above-described function of the base station 10. In addition, terms such as "uplink" and "downlink" may be read as terms corresponding to terminal-to-terminal communication (for example, "side"). For example, an uplink channel, a downlink channel, and the like may be read as a side channel.

Similarly, the user terminal in the present disclosure may be read as a base station. In this case, the base station 10 may have the above-described function of the user terminal 20.

The terms "connected" and "coupled" or variations thereof mean any direct or indirect connection or coupling between two or more elements, and can include a case where one or more intermediate elements are present between two elements "connected" or "coupled" to each other. The coupling or connection between elements may be physical, logical, or a combination thereof. For example, "connection" may be read as "access". When used in the present disclosure, two elements can be considered to be "connected" or "coupled" to each other using at least one of one or more wires, cables, and printed electrical connections and using some non-limiting and non-inclusive examples, such as electromagnetic energy having wavelengths in a radio frequency domain, a microwave domain, and a light (both visible and invisible) domain.

The reference signal may be abbreviated as RS (Reference Signal), and may be called Pilot according to the applied standard.

The description "based on" used in the present disclosure does not mean "based only on" unless otherwise specified. In other words, the description "based on" means both "based only on" and "based at least on".

When "include", "including", and variations thereof are used in the present disclosure, these terms are intended to be inclusive similarly to the term "comprising". In addition, the term "or" used in the present disclosure is intended not to be an exclusive-OR.

A radio frame may be configured by one or more frames in the time domain.

Each of one or more frames in the time domain may be referred to as a subframe.

In addition, the subframe may be configured by one or more slots in the time domain. The subframe may be a fixed time length (for example, 1 ms) that does not depend on numerology.

Numerology may be a communication parameter applied to at least one of transmission and reception of a given signal or channel. Numerology may indicate at least one of, for example, subcarrier spacing (SCS), bandwidth, symbol length, cyclic prefix length, transmission time interval (TTI), the number of symbols per TTI, radio frame configuration, specific filtering processing performed in the frequency domain by the transceiver, and specific windowing processing performed in the time domain by the transceiver.

A slot may be configured by one or more symbols (OFDM (Orthogonal Frequency Division Multiplexing) symbol, SC-FDMA (Single Carrier Frequency Division Multiple Access) symbol, and the like) in the time domain. A slot may be a time unit based on numerology.

A slot may include multiple mini-slots. Each mini-slot may be configured by one or more symbols in the time domain. In addition, the mini-slot may be called a subslot. A mini-slot may be configured by a smaller number of symbols than that in a slot. A PDSCH (or a PUSCH) transmitted in time units larger than the mini-slot may be referred to as PDSCH (or PUSCH) mapping type A. A PDSCH (or a PUSCH) transmitted using a mini-slot may be referred to as PDSCH (or PUSCH) mapping type B.

Each of the radio frame, the subframe, the slot, the mini-slot, and the symbol indicates a time unit when transmitting a signal. The radio frame, the subframe, the slot, the mini-slot, and the symbol may have different names corresponding thereto.

For example, one subframe may be called a transmission time interval (TTI), a plurality of consecutive subframes may be called a TTI, and one slot or one mini-slot may be called a TTI. That is, at least one of the subframe and the TTI may be a subframe (1 ms) in the existing LTE, a period (for example, 1 to 13 symbols) shorter than 1 ms, or a period longer than 1 ms. In addition, the unit indicating the TTI may be called a slot, a mini-slot, or the like, instead of a subframe.

Here, the TTI refers to, for example, a minimum time unit of scheduling in radio communication. For example, in the LTE system, the base station performs scheduling for allocating radio resources (frequency bandwidth, transmission power, and the like that can be used in each user terminal) to each user terminal in TTI units. In addition, the definition of the TTI is not limited to this.

The TTI may be a transmission time unit, such as a channel-encoded data packet (transport block), a code block, and a code word, or may be a processing unit, such as scheduling and link adaptation. In addition, when a TTI is given, a time section (for example, the number of symbols) in which a transport block, a code block, a code word, and the like are actually mapped may be shorter than the TTI.

In addition, when one slot or one mini-slot is called a TTI, one or more TTIs (that is, one or more slots or one or more mini-slots) may be a minimum time unit for scheduling. In addition, the number of slots (the number of mini-slots) configuring the minimum time unit of the scheduling may be controlled.

A TTI having a time length of 1 ms may be called a normal TTI (TTI in LTE Rel. 8-12), a long TTI, a normal subframe, a long subframe, a slot, and the like. A TTI shorter than the normal TTI may be called a shortened TTI, a short TTI, a partial or fractional TTI, a shortened subframe, a short subframe, a mini-slot, a subslot, a slot, and the like.

In addition, a long TTI (for example, a normal TTI or a subframe) may be read as a TTI having a time length exceeding 1 ms, and a short TTI (for example, a shortened TTI) may be read as a TTI shorter than the TTI length of the long TTI and equal to or longer than 1 ms.

A resource block (RB) is a resource allocation unit in the time domain and the frequency domain, and may include one or more consecutive subcarriers in the frequency domain. The number of subcarriers included in the RB may be the same regardless of numerology, and may be, for example, 12. The number of subcarriers included in the RB may be determined based on numerology.

In addition, the time domain of the RB may include one or more symbols, and may be the length of one slot, one mini-slot, one subframe, or one TTI. One TTI, one subframe, and the like may each be configured by one or more resource blocks.

In addition, one or more RBs may be called a physical resource block (PRB: Physical RB), a sub-carrier group (SCG), a resource element group (REG), a PRB pair, an RB pair, and the like.

In addition, the resource block may be configured by one or more resource elements (REs). For example, one RE may be a radio resource area of one subcarrier and one symbol.

A bandwidth part (BWP) (which may be called a partial bandwidth or the like) may indicate a subset of consecutive common resource blocks (RBs) for given numerology in a given carrier. Here, the common RB may be specified by an index of the RB with the common reference point of the carrier as a reference. The PRB may be defined by a given BWP and numbered within the BWP.

The BWP may include a BWP for UL (UL BWP) and a BWP for DL (DL BWP). For the UE, one or more BWPs may be set in one carrier.

At least one of the set BWPs may be active, and it may not be assumed that the UE transmits and receives a predetermined signal/channel outside the active BWP. In addition, "cell", "carrier", and the like in the present disclosure may be read as "BWP".

The structures of the radio frame, the subframe, the slot, the mini-slot, and the symbol described above are merely examples. For example, the number of subframes included in a radio frame, the number of slots per subframe or radio frame, the number of mini-slots included in a slot, the number of symbols and RBs included in a slot or mini-slot, the number of subcarriers included in an RB, the number of symbols in the TTI, the symbol length, the cyclic prefix (CP) length, and the like can be changed in various ways.

In the present disclosure, in a case where articles, for example, a, an, and the in English, are added by translation, the present disclosure may include that nouns subsequent to these articles are plural.

In the present disclosure, the expression "A and B are different" may mean "A and B are different from each other". In addition, the expression may mean that "A and B each are different from C". Terms such as "separate", "coupled" may be interpreted similarly to "different".

While the invention has been described in detail, it is apparent to those skilled in the art that the invention is not limited to the embodiments described in this specification. The invention can be implemented as modified and changed aspects without departing from the spirit and scope of the invention defined by the description of the claims. Therefore, the description of this specification is intended for illustrative purposes, and has no restrictive meaning to the invention.

EXPLANATIONS OF LETTERS OR NUMERALS

10 BASE STATION
20 TERMINAL
101 TRANSMITTING UNIT
102 RECEIVING UNIT
103 CONTROL UNIT
201 TRANSMITTING UNIT
202 RECEIVING UNIT
203 CONTROL UNIT
1001 PROCESSOR
1002 MEMORY
1003 STORAGE
1004 COMMUNICATION TERMINAL
1005 INPUT DEVICE
1006 OUTPUT DEVICE

The invention claimed is:

1. A terminal comprising:
a receiver that receives, from a base station, an indication to enable or disable a function to transmit feedback information;
a processor that generates a Type-2 codebook for the feedback information using a downlink assignment index included in downlink control information, the downlink assignment index being determined based on whether the function is to be enabled or disabled, such that the generated Type-2 codebook includes the feedback information for a transport block when the function is enabled, and that the generated Type-2 codebook does not include the feedback information for a transport block when the function is disabled; and
a transmitter that transmits the generated Type-2 codebook to the base station by using an uplink shared channel,
wherein the downlink assignment index is at least one of a counter downlink assignment index or a total downlink assignment index.

2. The terminal according to claim 1, wherein the receiver receives the indication via a higher layer signaling.

3. A base station comprising:
a transmitter that transmits, to a terminal, an indication to enable or disable a function to transmit feedback information;
a processor that includes, in downlink control information, downlink assignment index that is determined based on whether the function is to be enabled or disabled; and
a receiver that receives, via an uplink shared channel, a Type-2 codebook for the feedback information, the Type-2 codebook for the feedback information being generated by the terminal based on the downlink assignment index, such that the generated Type-2 codebook includes the feedback information for a transport block when the function is enabled, and that the generated Type-2 codebook does not include the feedback information for a transport block when the function is disabled,
wherein the downlink assignment index is at least one of a counter downlink assignment index or a total downlink assignment index.

4. A communication system comprising:
a terminal; and
a base station,
wherein the terminal includes:
a receiver that receives, from the base station, an indication to enable or disable a function to transmit feedback information;
a processor that generates a Type-2 codebook for the feedback information using a downlink assignment index included in downlink control information, the downlink assignment index being determined based on whether the function is to be enabled or disabled, such that the generated Type-2 codebook includes the feedback information for a transport block when the function is enabled, and that the generated Type-2 codebook does not include the feedback information for a transport block when the function is disabled; and
a transmitter that transmits the generated Type-2 codebook to the base station by using an uplink shared channel,
wherein the downlink assignment index is at least one of a counter downlink assignment index or a total downlink assignment index, and
wherein the base station includes a receiver to receive the Type-2 codebook.

5. A communication method executed by a terminal, the method comprising:
- receiving, from a base station, an indication to enable or disable a function to transmit feedback information;
- generating a Type-2 codebook for the feedback information using a downlink assignment index included in downlink control information, the downlink assignment index being determined based on whether the function is to be enabled or disabled, such that the generated Type-2 codebook includes the feedback information for a transport block when the function is enabled, and that the generated Type-2 codebook does not include the feedback information for a transport block when the function is disabled; and
- transmitting the generated Type-2 codebook to the base station by using an uplink shared channel,
- wherein the downlink assignment index is at least one of a counter downlink assignment index or a total downlink assignment index.

* * * * *